3 Sheets--Sheet 1.
J. STEPHENSON.
Street-Car.
Reissued May 11, 1875.
No. 6,427.
FIG. I.
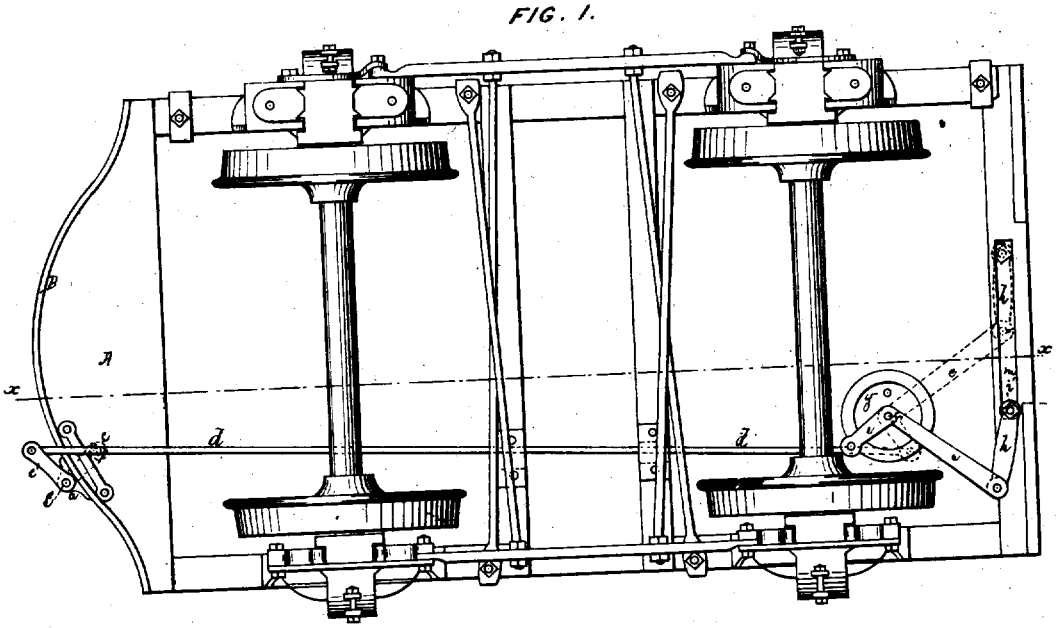
FIG. II.
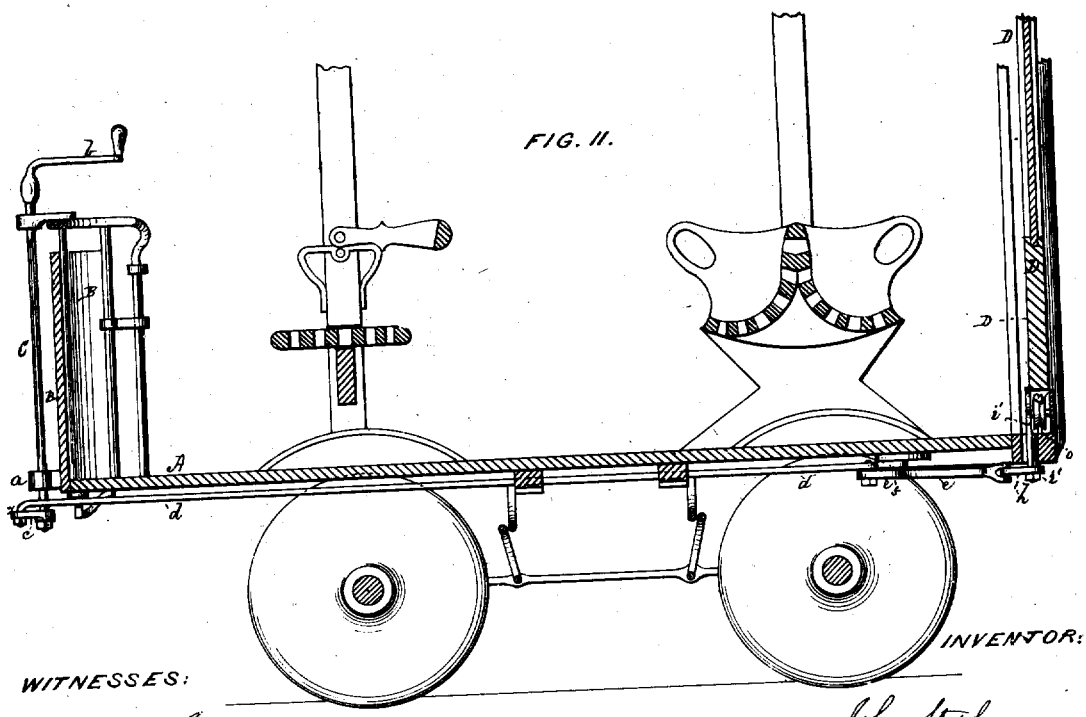
WITNESSES:
D. G. Stuart
A. McCallum
INVENTOR:
John Stephenson,
per P. Hannay
atty.
THE NORRIS PETERS CO., PHOTO-LITHO., WASHINGTON, D. C.

3 Sheets--Sheet 2.

J. STEPHENSON.
Street-Car.

No. 6,427.

Reissued May 11, 1875.

WITNESSES:

D. G. Stuart

A. M. Dallum

INVENTOR:

John Stephenson per P. Hannay

Atty.

THE NORRIS PETERS CO., PHOTO-LITHO., WASHINGTON, D. C.

3 Sheets--Sheet 3.

J. STEPHENSON
Street-Car.

No. 6,427.

Reissued May 11, 1875.

WITNESSES:

D. G. Stuart

A. McCallum

INVENTOR:

John Stephenson per D. Hanna

Atty.

THE NORRIS PETERS CO., PHOTO-LITHO., WASHINGTON, D. C.

BEST AVAILABLE COPY

UNITED STATES PATENT OFFICE.

JOHN STEPHENSON, OF NEW YORK, N. Y.

IMPROVEMENT IN STREET-CARS.

Specification forming part of Letters Patent No. 155,118, dated September 15, 1874; reissue No. 6,427, dated May 11, 1875; application filed April 20, 1875.

DIVISION *a* OF B B.

*To all whom it may concern:*

Be it known that I, JOHN STEPHENSON, of New York, in the county of New York and State of New York, have invented certain new and useful Improvements in Devices for Operating Street-Car Doors; and I do hereby declare that the following is a full, clear, and exact description thereof, that will enable others skilled in the art to which it appertains to make and use the same, reference being had to the accompanying drawings and to the letters of reference marked thereon, which form a part of this specification, in which—

Figure 3:
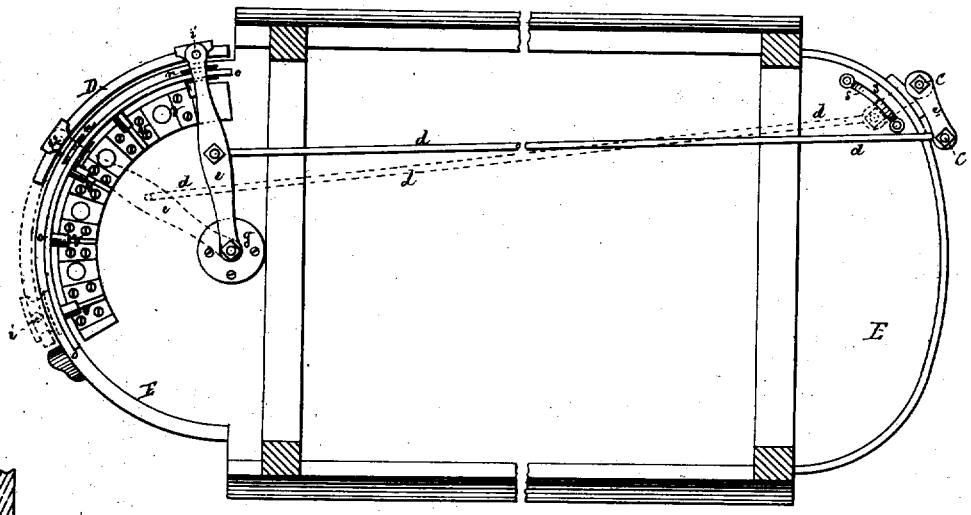
Figure 7:
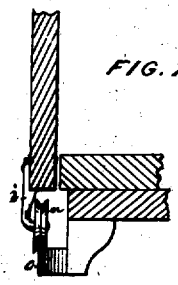
Figure 5:
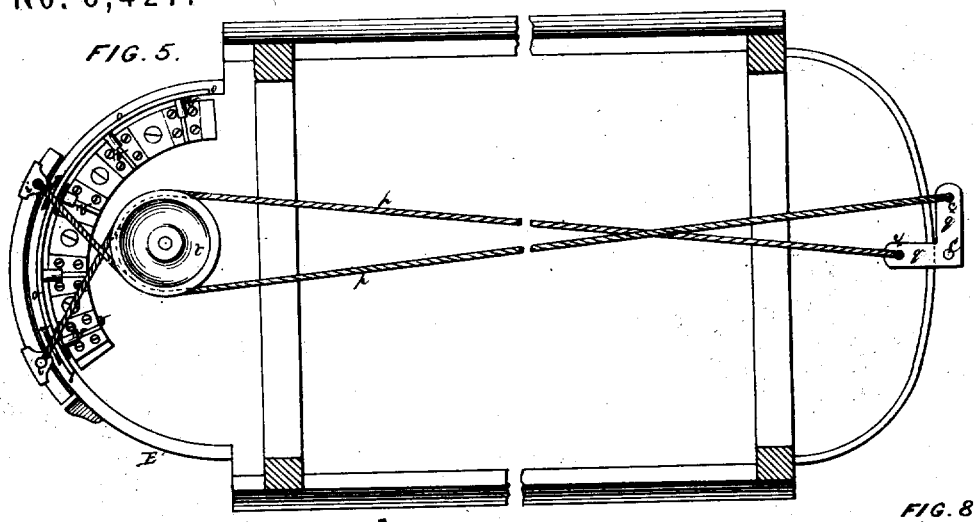
Figure 8:
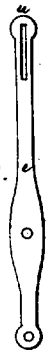
Figure 6:
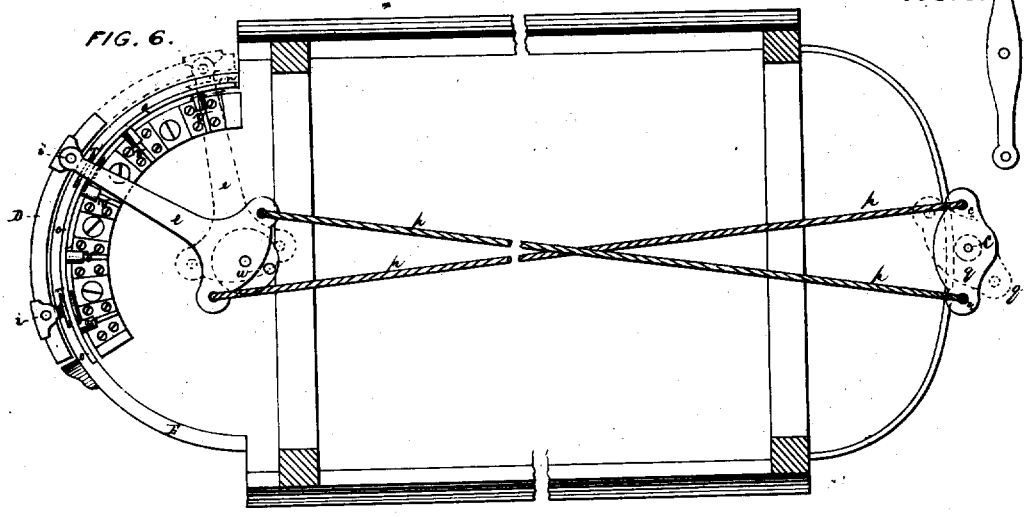
Figure 9:
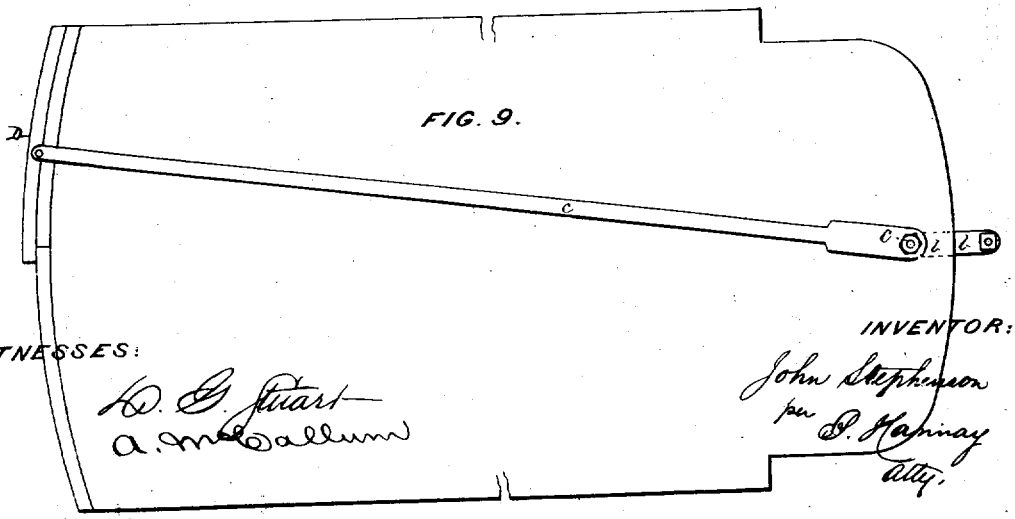

Figure 1 represents a bottom view or plan of a square-ended summer-car having my improved method of operating the door applied thereto; and Fig. 2, a vertical section of the same as taken through the line *x x* of Fig. 1, the roof and a portion of its side supports being removed, and the upper end of the rear wall and the entrance-door broken off. Fig. 3 represents a plan or bottom view of a car with a curved extension at the rear, and door moving in a circular way, having my improved method of operating the door applied thereto, the running-gear of the car being removed; and Fig. 4, a rear elevation of the same. Figs. 5 and 6 represent bottom views of modifications of my improved method as applied to Fig. 3, or the car with the curved extension; Fig. 7, a detached view of the door-leg and roller; and Fig. 8, a modified form of the operating-lever. Fig. 9 represents another modification of my method of operating the door.

The extensive use of street-cars managed without the aid of a conductor has created a demand for methods by which the driver can operate the rear door of the car. My present invention relates solely to an improved method of effecting this object, and is especially adapted to cars having an inclosed extension beyond the rear of the car-body, although it also works well on cars of ordinary form.

This improved method consists in combining a rock-shaft in the front of the car with the door in the rear, in such manner that the driver, by turning the former, can, through the instrumentality of a crank-handle or lever arranged on one of its ends, and within convenient reach of his hand, open or shut the door, according to the direction in which he turns it, by reason of an arm or arms secured to its other end, and of a suitable connection or connections made between it or them and the door.

To enable others skilled in the art to make, construct, and use my improvement, I will now proceed to describe its parts in detail, omitting a particular description of such parts of a car as are non-essential to a full understanding of my present invention.

In Figs. 1 and 2 the car is represented as being of the ordinary form—that is to say, of an oblong form, and having the door, on being opened and shut, sliding in a right line across the end of the car. Immediately at the front end, and slightly at one side of the driver's platform A, in suitable bearings *a*, secured to the frame of the dash-board B, is mounted a rock-shaft, C, having a crank-handle or lever, *b*, secured to or otherwise formed on one end for the use of the driver, and an arm or lever, *c*, at its other end, through which and a suitable device or devices to open or shut the passenger-door D at the rear of the car. A suitable device for this purpose is represented in Figs. 1 and 2 of the drawings, and which consists of a stout rod, *d*, pivoted at one end to the outer end of the arm *c*, and at the other to one end of an operating-lever, *e*, (in this case of angular form,) and having its fulcrum, at or near the apex of its angle, on a pivotal pin, *f*, fastened, by means of a plate, *g*, to the bottom of the car. To the other end of the angle-lever *e* is pivoted one end of another arm or lever, *h*, the other end of which is pivoted to the end of an arm, *i'*, suitably attached to the door D. In this case the arm *i'* is secured to one of the plates which support the axle of the ordinary grooved rollers or sheaves *n*, that carry the door D, and of which there are two, and run on a way, *o*, secured to the upper side of the end rail of the car; but the car may have its door hung to run or roll by any of the known methods, in either of which cases, however, a guide-slot, *m*, is used, through which the leg *i'* passes or extends, and is then connected to the arm *h*, as before described. The door, thus connected with the rock-shaft C, can be instantly opened or closed by simply turning the crank *b* in the required direction. This mode is specially adapted to the operating of car-doors which slide or move in a straight line, as in the ordinary square-ended car, or in cars having an extension in the rear, with straight sides set at an angle to each other, and provided with a door moving in a right line.

Figure 4:
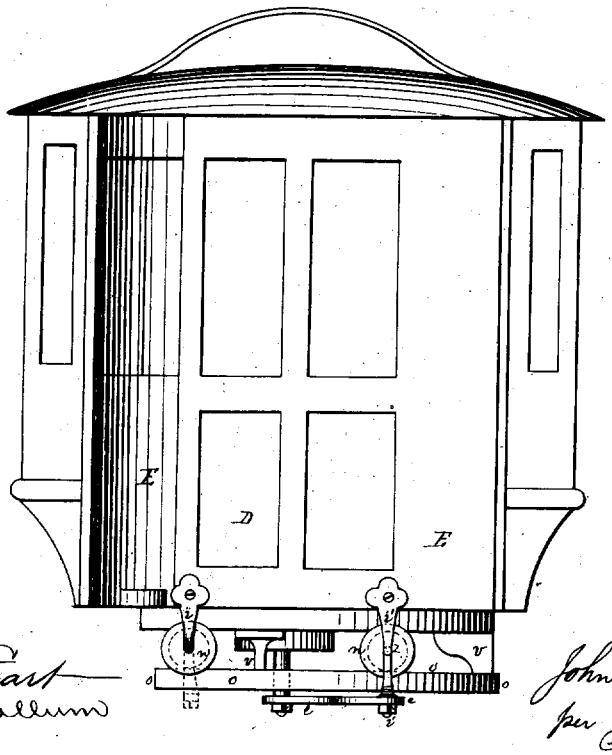

In Figs. 3 and 4 the same device is represented as being applied to the door of a car, with a curved extension, E, in rear, the door in this case being correspondingly curved, and when opened or shut traveling in a correspondingly-curved way. The device in this case simply differs in the construction or shape of the operating-lever *e*. In the former case it was made crooked or angular and pivoted at the angle. In this it is straight, and pivoted at one end to the bottom of the car, and radial to the curve of the extension, its outer end being attached, or rather mounted, directly upon the lower end of the door-leg *i'*, as on a pivot, and on which it is kept in place by a screw-nut or other suitable device. The connecting-rod *d* in this case is pivoted to the lever *e*, at or near its middle, according to the length of throw of the arm *c* on the end of the rock-shaft C, so that it shall be able fully to open or close the door, and no more. A stop-piece, *s*, in both cases is arranged at the side of the arm *c*, to arrest its course when the door has been fully opened or closed to prevent unnecessary jar and shattering of the glass.

This car, with its inclosed extension like the ordinary car, may have its rear door hung to roll or run by any of the known methods, although it is deemed better to have the rail or way *o* external of and underneath the car, and the door supported by two legs, *i* and *i'*, the foot of one, *i*, being bent around to form an axis for one of the supporting sheaves or rollers, *n*, and the foot of the other leg, *i'*, resting in the end of the lever *e*, which operates the door. A spur, *z*, secured to the inner side of this leg, at or near its middle, forms the axis of the other or second sheave or roller. The way *o* is supported on brackets *v*, secured to the under side of the car-floor. The door, as thus connected to the rock-shaft C, is operated by the driver through the medium of the handle *b* by a pull-and-push motion of the connecting-rod *d*, according as the door is intended to be opened or shut.

The connection between the operating-lever *e* and the rock-shaft C may be modified by using two smaller rods, or their equivalents, (two cords or chains, *p*, Fig. 6,) in which case the power will be transmitted to the door both ways by a pull motion. To this end the operating-lever *e* should have its back end to extend beyond the fulcrum of the lever and fork, so as to receive the two pull connections, and so as each shall be equidistant from the fulcrum; or it may be desirable to give its back end the form shown at *w* in Fig. 6. In either event the use of such will involve the use of two arms or a cross-head, *q*, on the lower end of the rock-shaft C, as shown in Figs. 5 and 6; or the pull connections, when they consist of cords or chains, may be connected directly to the two legs of the door, and to the cross head *q* at their other ends, as shown in Fig. 5, in which case a grooved friction roll or rolls, *t*, may be used with advantage as a fulcrum for the flexible levers, (the cords or chains,) whereby to open or close the door; or the rolls *t* may be dispensed with, and the cords or chains crossed in their passage to the reverse ends of the cross-head; or the door of the curved extension may be closed by the use of a straight pivoted lever, *e*, having a single rearward extension, such as that shown in Fig. 8, to the extremity *u* of which the outer end of the arm *c* of the rock-shaft, by means of a longitudinal slot cut therein, may be pivoted, while its inner end would be pivoted to the leg or pendant secured to the lower part of the door.

Many other ways may be described of operating the door through the medium of a rock-shaft, C, carrying a handle, *b*, for the use of the driver, and an arm, *c*, at its other end, for operating the door, such as that shown in Fig. 9; but as such would not in any degree alter the principle of my invention, it is not deemed necessary to describe them, nor are such deemed unprotected by this patent.

Having described my invention, what I claim as new, and desire to secure by Letters Patent, is—

A rock-shaft, C, carrying at one end a crank-handle, *b*, at the front of the car, and at the other an arm or arms, *c*, in combination with a car and car-door, the arm or arms *c* being connected to the latter, substantially as and for the purposes set forth.

In testimony that I claim the foregoing I have hereunto set my hand this 31st day of October, 1874.

JOHN STEPHENSON.

Witnesses:
WM. JNO. WALKER,
STUART A. STEPHENSON.